UNITED STATES PATENT OFFICE.

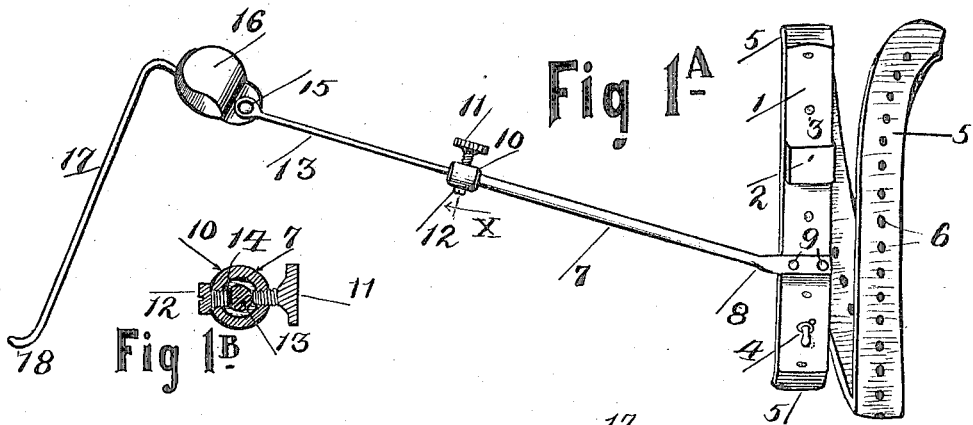
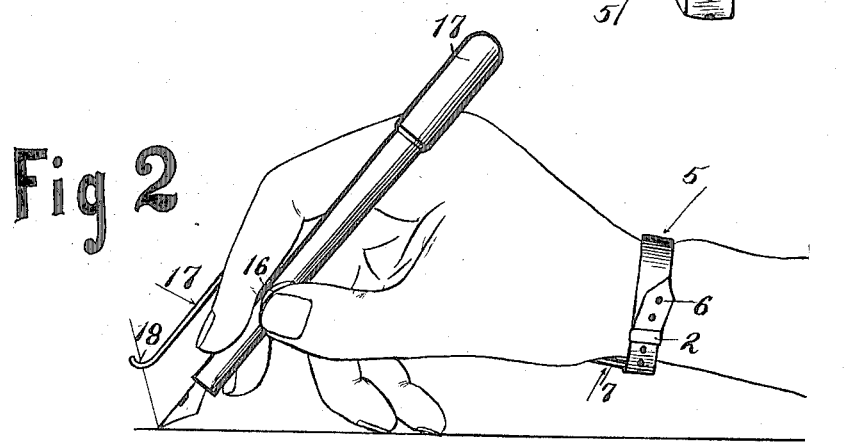
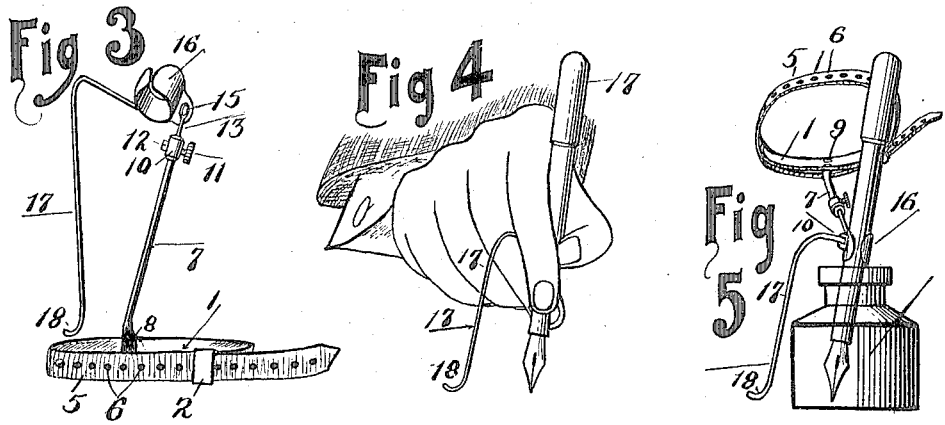

WILLIAM J. HENRY, OF AKRON, OHIO, ASSIGNOR OF ONE-HALF TO GLENN C. WILCOX, OF AKRON, OHIO.

DEVICE FOR MECHANICALLY AIDING THE HAND IN WRITING.

1,197,289.  Specification of Letters Patent.  Patented Sept. 5, 1916.

Application filed October 20, 1915. Serial No. 57,020.

*To all whom it may concern:*

Be it known that I, WILLIAM J. HENRY, a citizen of the United States, residing at Akron, in the county of Summit and State of Ohio, have invented new and useful Improvements in Devices for Mechanically Aiding the Hand in Writing, of which the following is a specification.

This invention relates to improvements in devices for holding the fingers of the human hand in correct writing position, and the object of the invention is to provide a device which will mechanically aid in the control of the fingers, hand and forearm in writing to insure the correct position and compel proper muscular movement, especially in the proper training of the young and for assisting adults in overcoming any existing evils or false methods in holding the hand during the writing operation. The finger movement may be substantially eliminated by this device and it will insure what is called the muscular movement, wherein the hand moves on the under muscle of the forearm. The device is also capable of preventing a twisting of the hand at the wrist so as to hold a pen or pencil in a substantially vertical or correct position.

A further object of the invention is to provide a simple, durable, easily made, cheap and serviceable device for insuring proper position of the hand during writing and one which is capable of being easily placed in position and removed, and which when in position will not impair free use of the fingers and hand when the grasp on the pen or pencil is released.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1ᴬ, is a perspective view of a device embodying this invention; Fig. 1ᴮ, is a transverse sectional view of the device on line X of Fig. 1; Fig. 2, is a view showing the device in operation looking at the side of the hand; Fig. 3, is a perspective view looking from the bottom of the device when collapsed; Fig. 4, is a view of the device showing the device in operation looking from the front of the hand; and, Fig. 5, is a perspective view of the device in operative connection with a pen-holder during the insertion of a pen into an ink receptacle.

Throughout the specification and claims the word "pen" will be used generically to denote a penholder, pencil, crayon, brush or any other implement of a similar nature, and while the word "pen" is used in this way no limitation of the invention is thereby intended.

Referring to the drawings in detail the reference numeral 1 denotes a curved strip of thin, flexible sheet material provided on its convex face with a strap-end-loop or keeper 2, and is further provided with a plurality of apertures to receive rivets or holding means 3. This outer convex face of the strip 1 is also provided with a pin 4 constituting a tongue for a purpose to be later described. Secured to the concave side of the strip 1 is a strap 5 of leather or any other suitable material, which is provided with a plurality of openings 6. Secured to the convex face of the strip 1 is a tube 7 having a flattened portion 8 at an angle with respect to the main portion of the tube 7 and secured in position by some means such as rivets 9. Either formed integrally with the outer end of the tube 7 or fixedly secured thereon is an enlarged head or collar 10 provided with a threaded aperture to receive a thumb-nut 11 and on the opposite side with a threaded opening to receive a set-screw 12. Slidably mounted in the tube 7 is a rod 13 having a flattened portion 14 against which the set-screw 12 engages. The outer end of the rod 13 is provided with an apertured flattened end to receive a pin or rivet 15 for coupling a spring clip 16 thereto. The spring clip 16 consists of a pair of spring fingers adapted to grasp and frictionally hold a pen or pencil 17. Secured to the clip 16 is an arm 17 the lower end 18 of which is preferably bent up to insure a smooth surface for engagement with the paper or article on which the writing is to be placed.

In operation, the strap 5 is wrapped about the wrist as shown in Fig. 2 and drawn up and the tongue 4 inserted in one of the openings 6 and the free end of the strap is then passed through the keeper 2 which prevents unintentional disengagement of the strap end from the tongue 4. The set-screw 11 is then released and the pen is grasped in the proper position by the fingers of the hand and after adjusting the same to the requirements of the particular person wearing the device, the set screw 11 is tightened which prevents any further forward or backward movement of the fingers, and during the writing operation the user will be compelled to adopt the so-called muscular movement in writing by reason of the fact that the fingers cannot be successfully or easily used. The arm 17 will be so arranged and adjusted as to rest lightly on the paper and approximately on the same line horizontally as the point of the pen or pencil and it serves not only to prevent the hand being turned or assuming an improper writing position, but also serves to support the hand away from the paper so that only the tips of the unemployed fingers will rest upon the paper.

Of course, any other order or mode of procedure may be employed by the user in positioning the device if he so desires.

The device is remarkably efficacious in drilling and teaching children and beginners the proper position which the hand, wrist and fingers should assume in the writing operation and break up the habit or prevent the habit of what is known as finger writing.

I claim:—

A device of the class described comprising a wrist-encircling element, a pen-engaging element, a tubular member connected with one of said elements, a member connected pivotally with the other element and slidable in said tube whereby an adjustable connection is formed between said elements, and clamping means carried by one member engaging the other member to temporarily hold one element in a determinate position.

In testimony whereof I have hereunto set my hand.

WILLIAM J. HENRY.

Copies of this patent may be obtained for five cents each, by addressing the "Commissioner of Patents, Washington, D. C."